INVENTOR
ALBERT A. GORDON
Southgate Fay & Hawley
ATTORNEYS

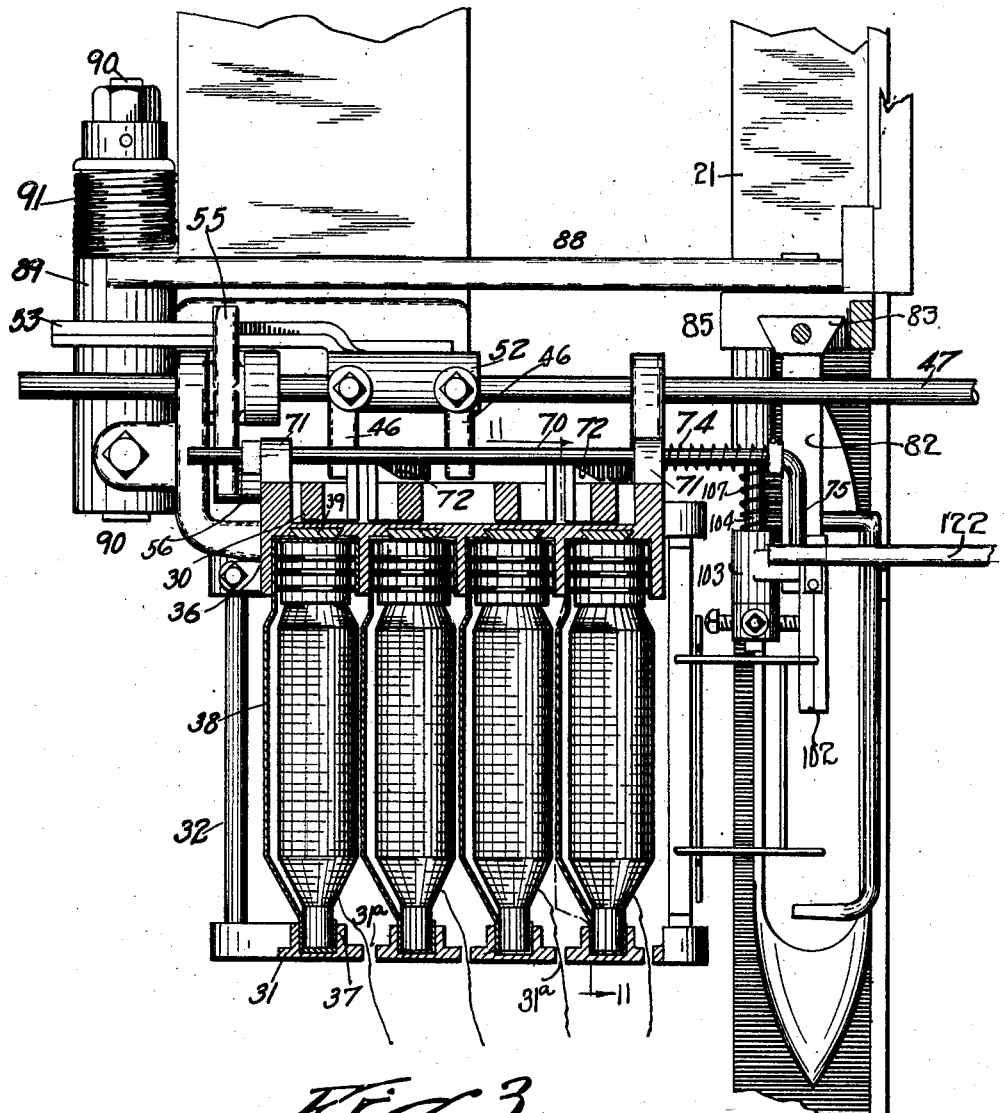

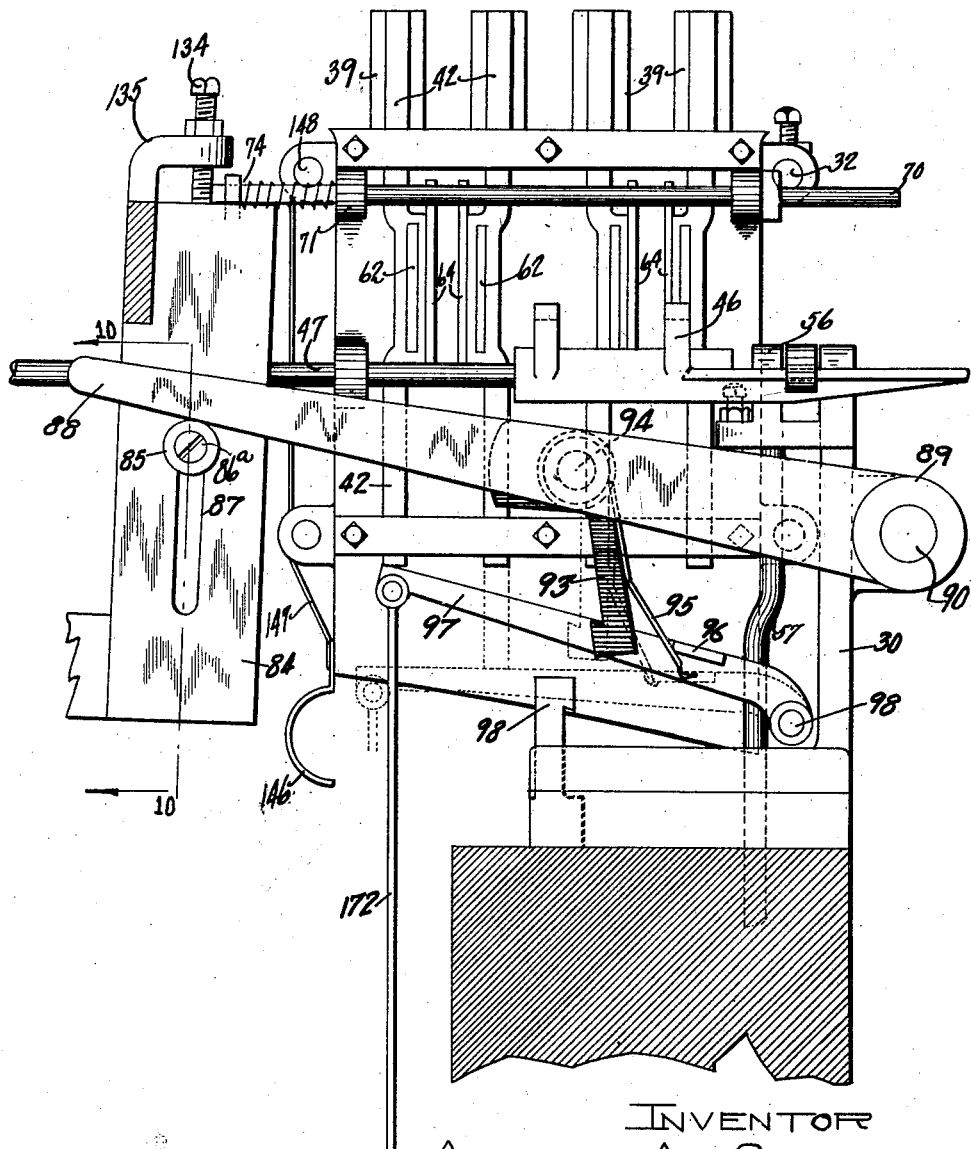

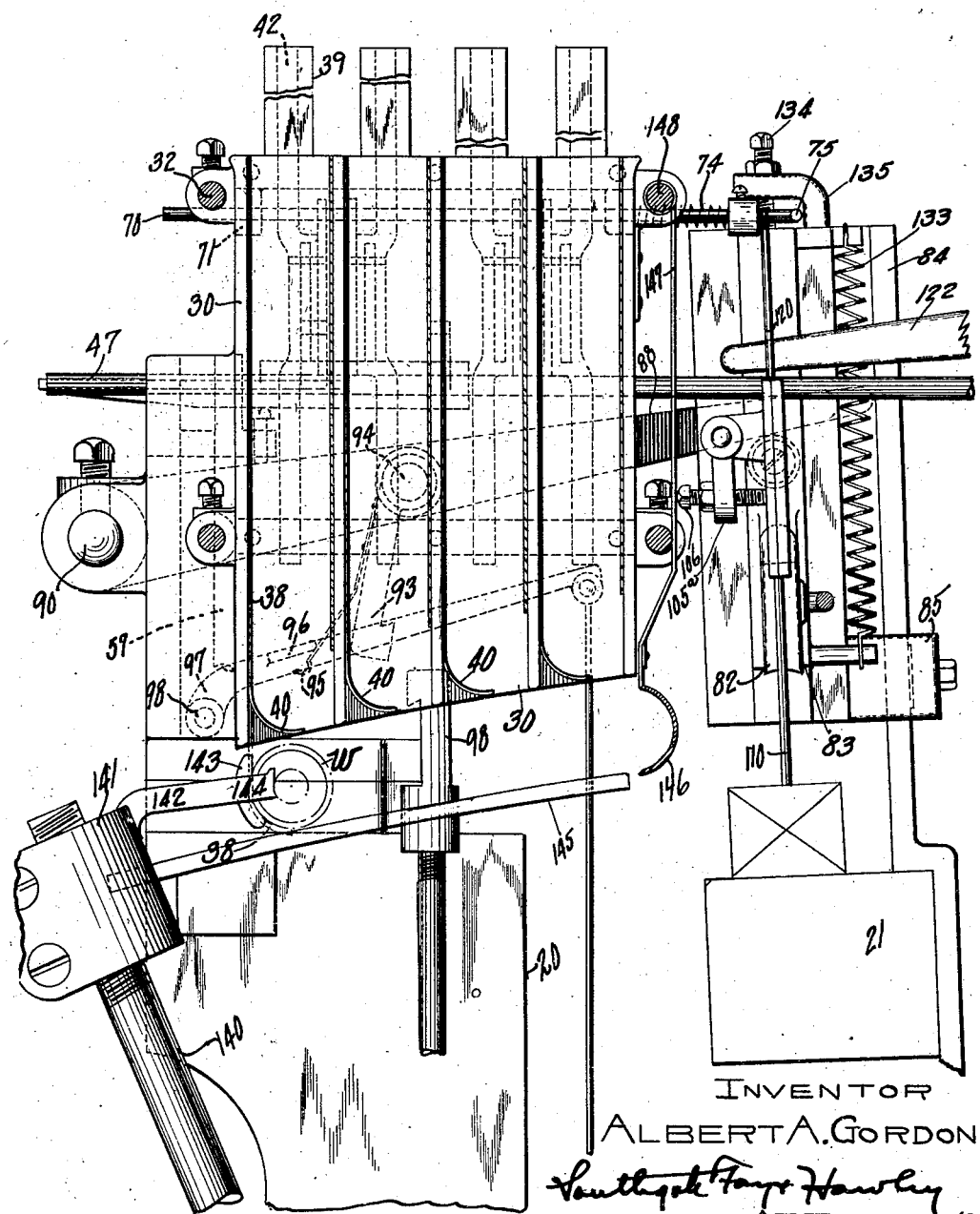

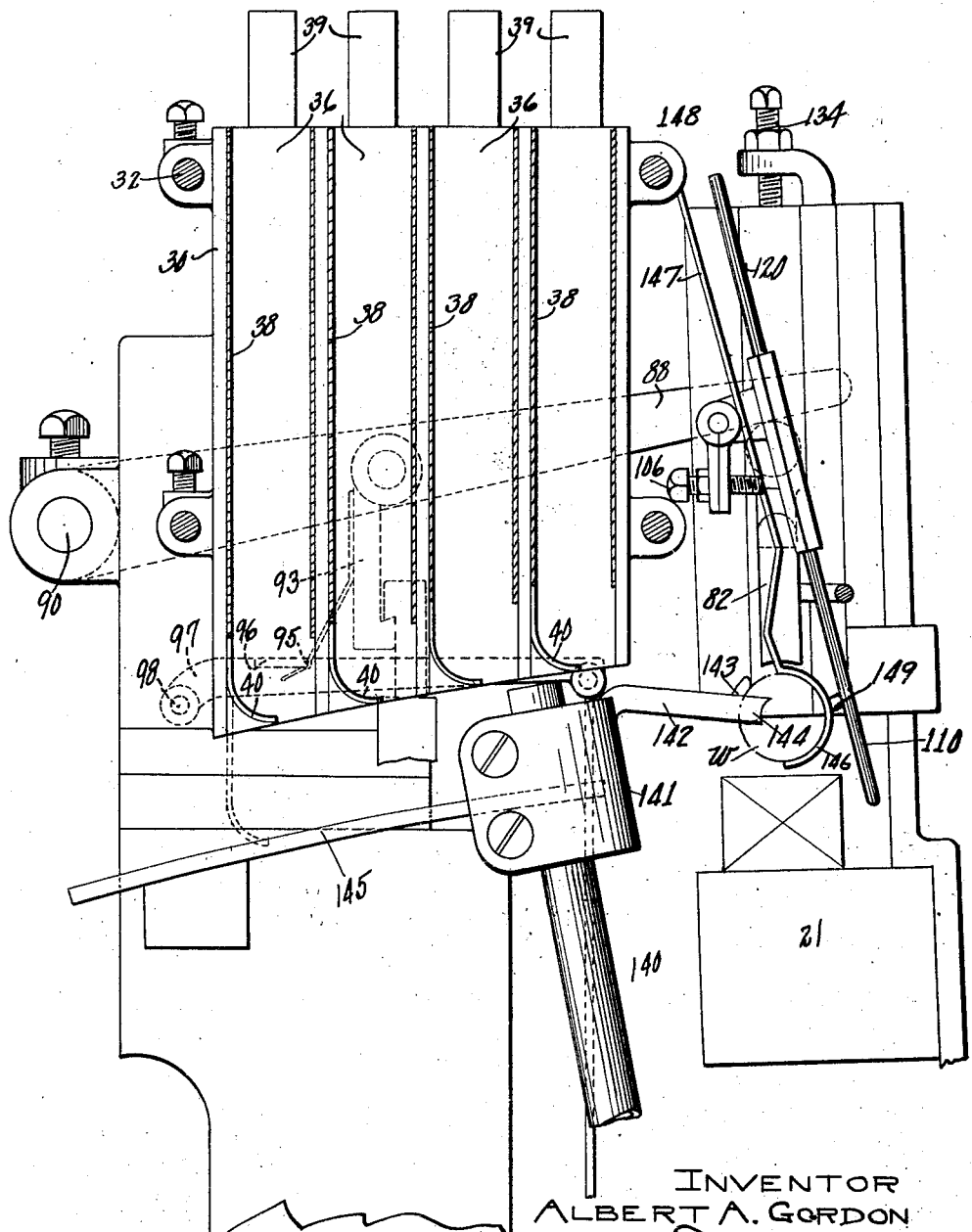

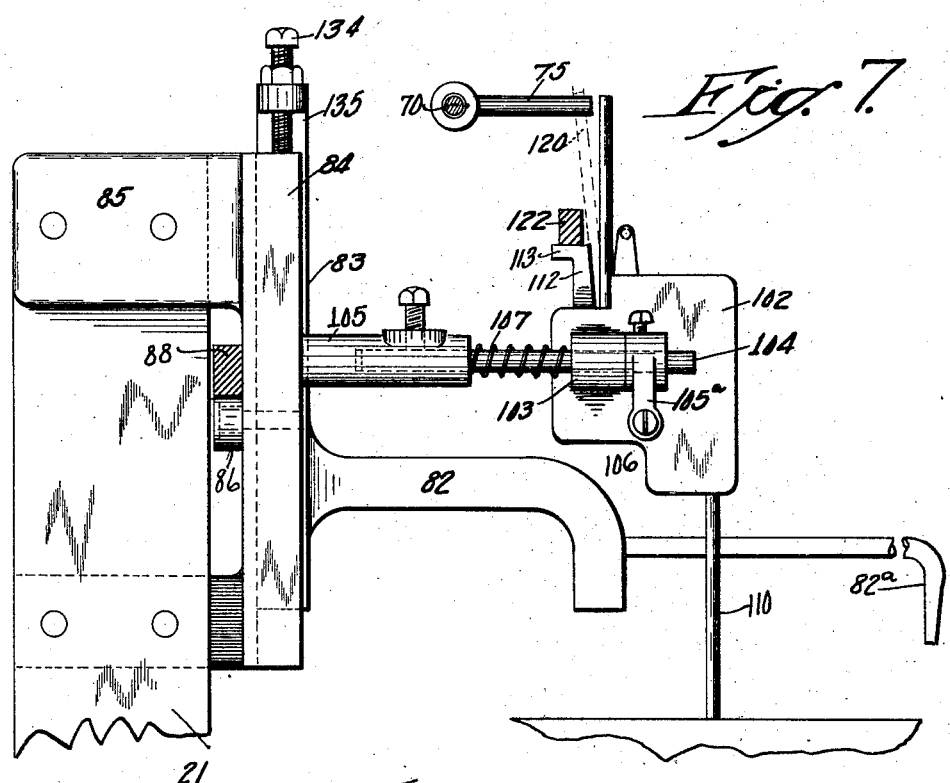
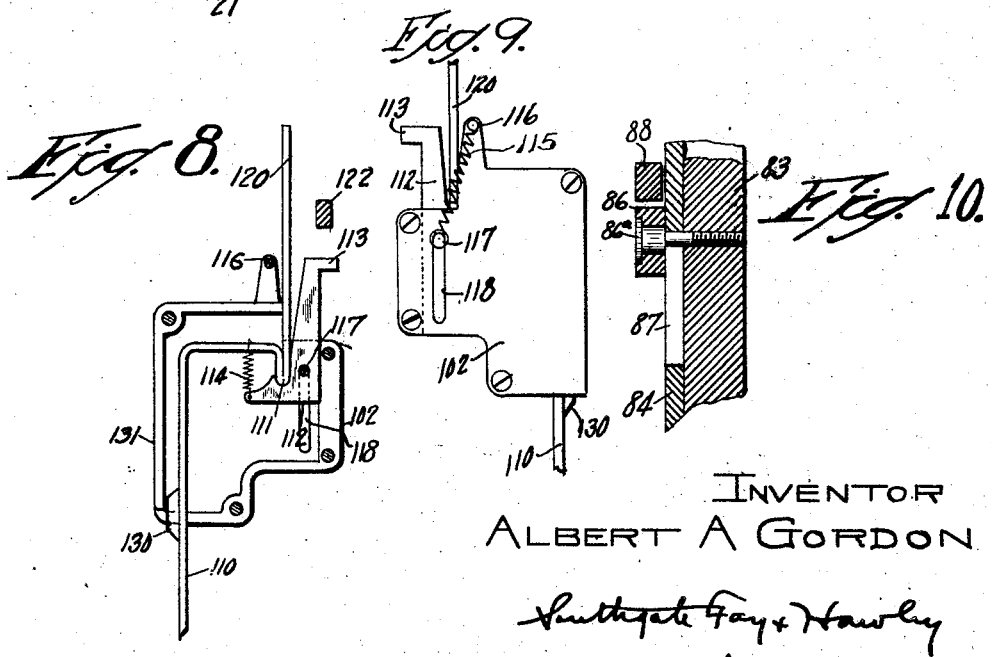

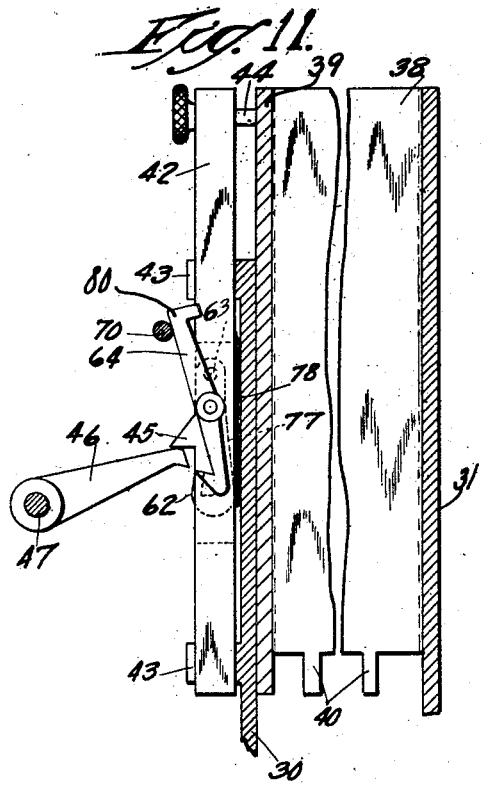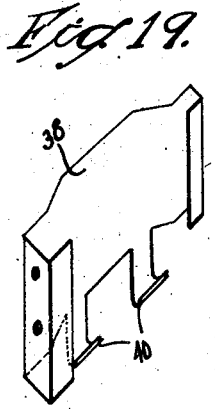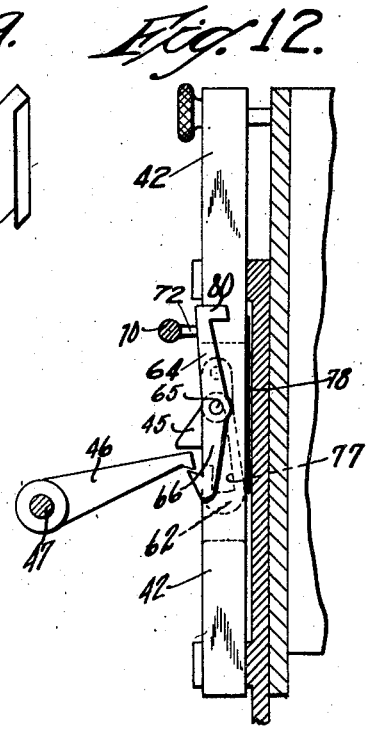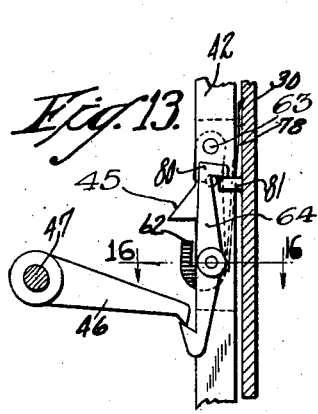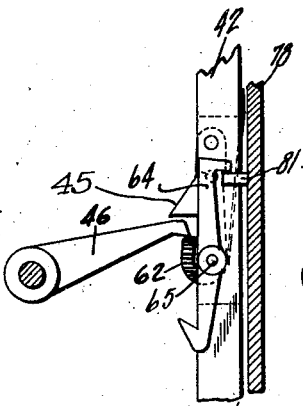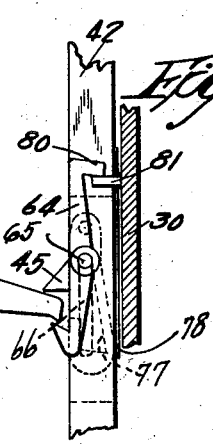

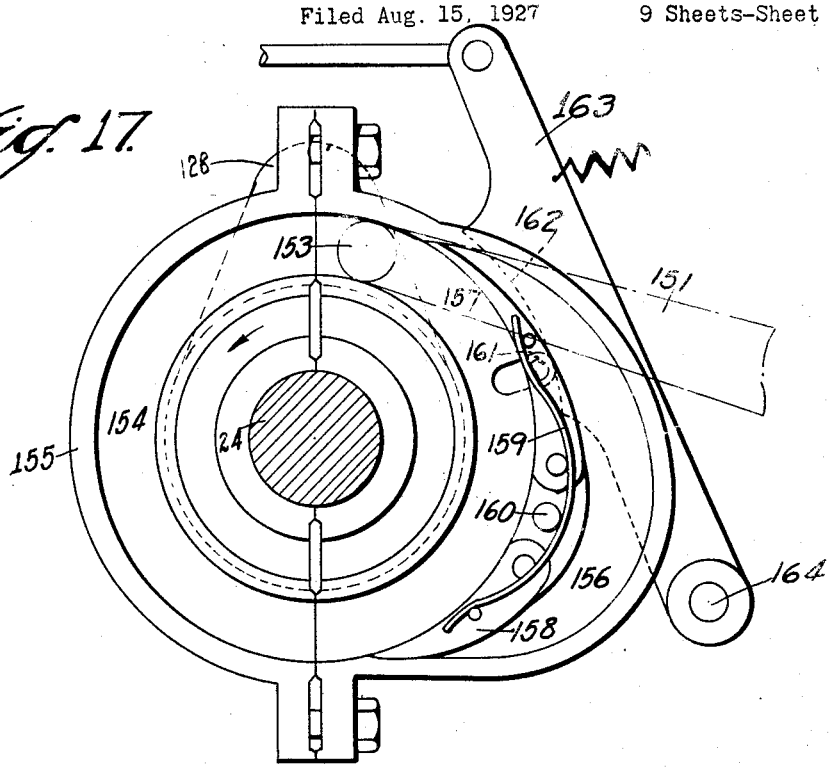
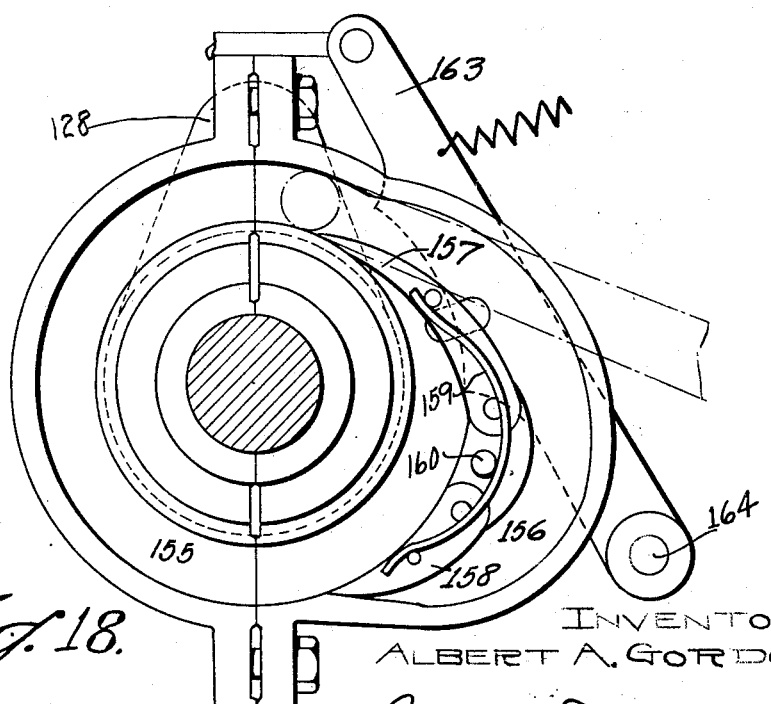

Patented June 24, 1930

1,766,895

UNITED STATES PATENT OFFICE

ALBERT A. GORDON, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

WEFT-REPLENISHING LOOM

Application filed August 15, 1927. Serial No. 212,996.

This invention relates to a loom in which the supply of weft in the running shuttle is automatically replenished upon substantial exhaustion thereof. It further relates to a weft replenishing loom in which a plurality of shuttles are used, which shuttles carry weft of different colors or different characteristics. In such weft replenishing looms as heretofore manufactured, the weft carriers have commonly been released and allowed to drop more or less freely to a transfer point and during this free movement, the weft carriers have sometimes become displaced so that inaccurate transfer occurs, in which event breakage of shuttles or other parts was not unusual.

It is one important object of my invention to provide a construction in which the released weft carrier will be positively advanced to the transferrer and will have no free movement between the magazine and the shuttle.

A further object is to provide a construction in which the weft detector and transferrer are mounted on the lay and preferably operate through the open top of the shuttle, thus avoiding the necessity for slots or openings in the side of the shuttle or in the box plate or binder.

Further features of the invention relate to the provision of an improved magazine construction in which the weft carriers are mounted in separate compartments, each compartment being individually movable downward to provide an indicated weft carrier for transfer. I further provide an improved type of weft detector and a novel support or mounting therefor, which permits the weft detector to be moved laterally out of the path of the transferrer during weft replenishment.

My invention further relates to arrangements and combinations of parts which will be hereinafter described and more particularly pointed out in the appended claims.

A preferred form of the invention is shown in the drawings in which

Fig. 3 is a sectional plan view, taken along the line 3—3 in Fig. 2;

Fig. 4 is a left hand side elevation of the magazine, looking in the direction of the arrow 4 in Fig. 2;

Fig. 5 is a right hand sectional side elevation of the magazine, taken along the line 5—5 in Fig. 2;

Fig. 6 is a view similar to Fig. 5, but showing the parts in a different position;

Fig. 7 is a front elevation of the transfer and weft detecting mechanism;

Fig. 8 is a sectional front elevation of the weft detector;

Fig. 9 is a rear view thereof;

Fig. 10 is a detail sectional elevation, taken along the line 10—10 in Fig. 4;

Fig. 11 is a sectional front elevation of the magazine, taken along the line 11—11 in Fig. 3;

Figs. 12, 13, 14 and 15 are detail sectional front elevations, showing certain of the parts appearing in Fig. 11 but in different successive positions;

Fig. 16 is a detail sectional plan view, taken along the line 16—16 in Fig. 13;

Fig. 17 is a side elevation of an actuating cam to be described;

Fig. 18 is a view similar to Fig. 17, but showing the parts in a different position;

Fig. 19 is a perspective view of one of the bobbin holders; and

Fig. 20 is a top plan view of the cams looking in the direction of arrow 20, Fig. 1.

Figure 1:
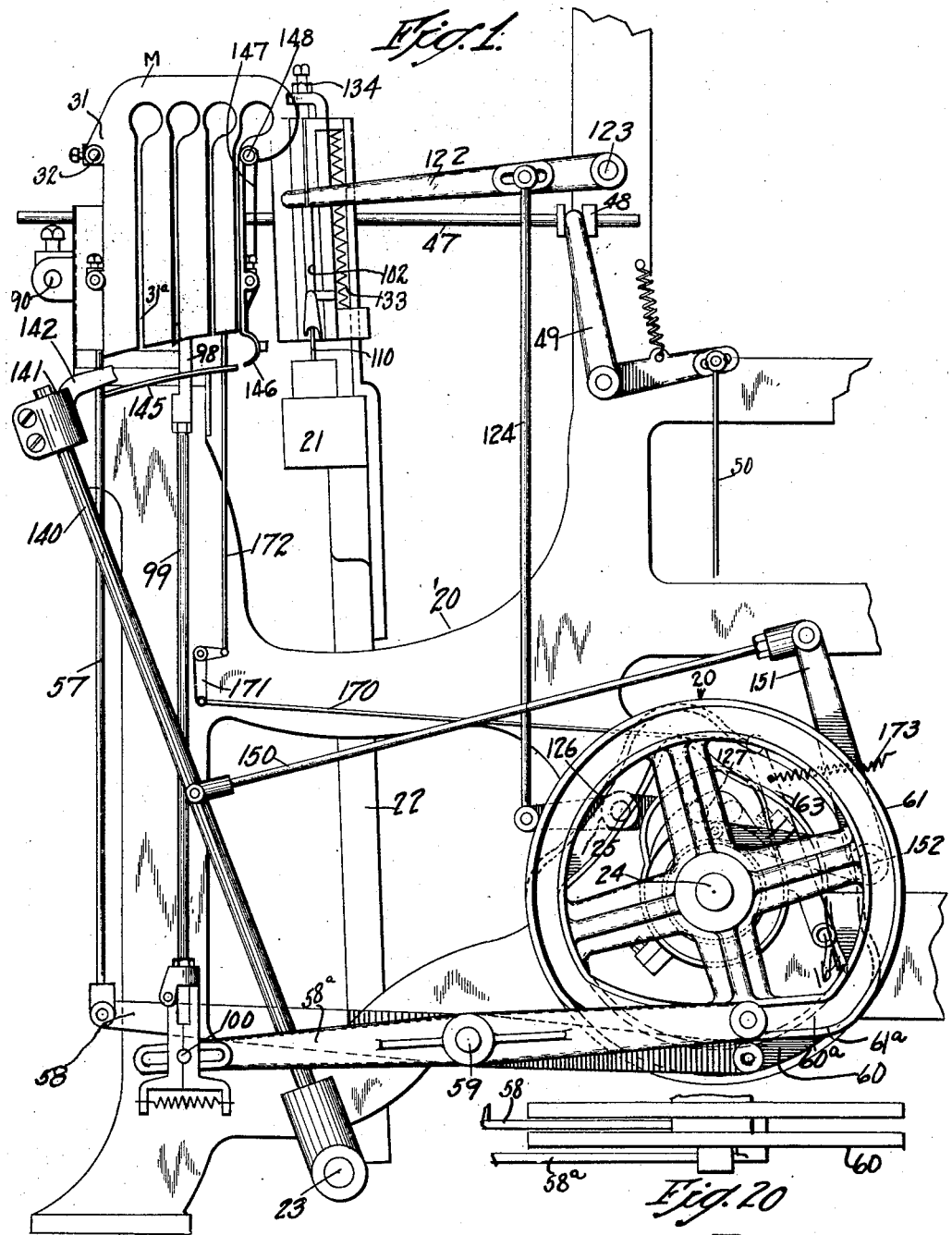
Fig. 1 is a side elevation of parts of a weft replenishing loom embodying my improvements.

Referring to the drawings, I have indicated a portion of a loom frame 20 (Fig. 1) on which a lay 21 is supported by swords 22, swinging about a rock shaft 23 and oscillated forward and rearward by the usual crankshaft and connecting arms (not shown). I have also indicated the usual bottom or cam shaft 24 which makes one complete revolution for every two beats of the lay.

Magazine

Figure 2:
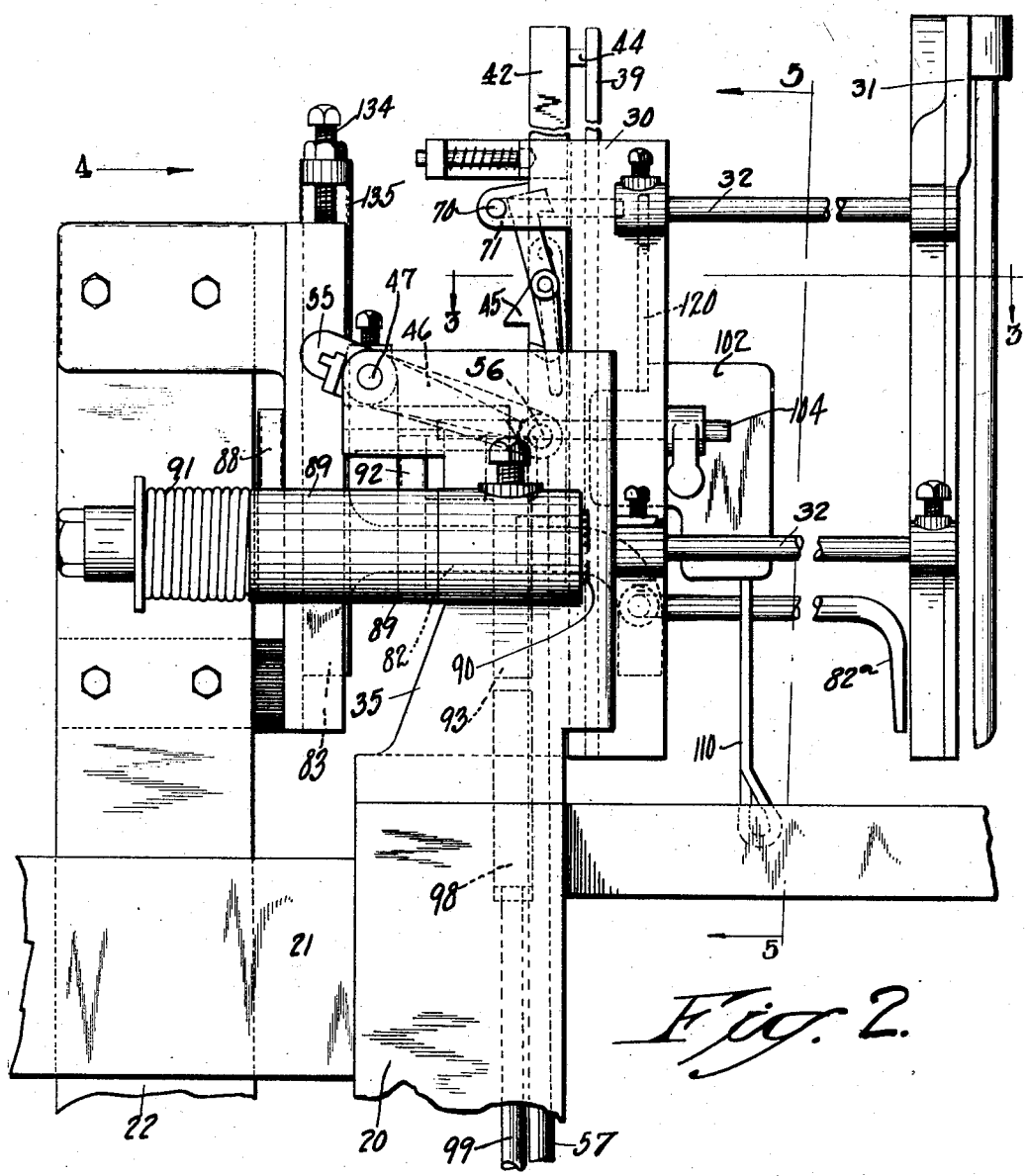
Fig. 2 is a front elevation of the magazine.

My improved magazine M comprises frame portions 30 and 31 (Fig. 2) secured in definite spaced relation by rods 32. The magazine head 30 is secured in a bracket 35 (Fig.

2) adapted to be bolted to the loom frame 20, and the head 30 is provided with a plurality of vertical recesses 36 (Fig. 3). The magazine end frame 31 is provided also with corresponding vertical recesses 37. A bobbin holder or compartment 38 is slidable vertically in each associated pair of recesses 36 and 37. The general appearance of one of these bobbin holders is clearly shown in Fig. 19 and the cross section thereof appears in Fig. 3.

The bobbin holders are preferably of sheet metal construction, bent at their opposite ends to form recesses to receive the butts and tips of the weft carriers, and offset outwardly at their intermediate portions to clear the weft thereon.

A dove-tailed guide strip 39 (Fig. 3) is preferably secured to the head end of each bobbin holder, said strips 39 being slidable in vertical dove-tailed guideways in the magazine head 30. At its lower end, each magazine holder is provided with rearwardly and downwardly projecting curved fingers 40 (Figs. 5 and 11) adapted to prevent downward displacement of the bottom weft carrier while the holder is in normal raised position, but permitting rearward displacement therefrom when the holder is in lowered position.

*Magazine actuating mechanism*

I will now describe the mechanism by which the weft carrier holders 38 are selectively depressed to present a weft carrier for transfer. A lifter bar 42 (Fig. 11) is mounted for vertical sliding movement in slotted projections 43 on the magazine head 30 and each lifter bar 42 is connected by a stud or pin 44 to its associated weft carrier holder 38. Each bar 42 has an outward projection or shoulder 45 adapted to be engaged by an arm 46 on a rock shaft 47, as said arm moves upwardly.

The shaft 47 corresponds to the usual color slide in a multi-color stationary magazine and is extended rearwardly, as indicated in Fig. 1, and provided with a grooved collar 48 engaged by a bell crank 49 connected by a link 50 and other connections (not shown) to the vertically moving drop boxes at the opposite side of the loom, whereby the rock shaft or color slide 47 will be moved forward and rearward to correspond to the raising and lowering of the drop boxes. This positioning mechanism is old and well known in automatic weft replenishing looms and forms no part of my present invention.

Reference to Fig. 3 will show that two of the engaging arms 46 are provided on a sleeve 52 secured to the shaft 47, said sleeve having an offset extension 53 disposed parallel to the shaft 47 and spaced therefrom. The extension 53 extends through a slot or opening in an arm 55 (Fig. 2) loosely mounted on the shaft 47 and having its opposite end pivotally connected at 56 to a rod or link 57 (Fig. 1) extending downward to a lever 58 pivoted at 59 on the loom frame 20 and having a cam roll at its rear end positioned within the cam groove 60 of a cam 61, mounted on and rotating with the cam shaft 34.

By the connections above described, the arms or fingers 46 (Figs. 3 and 11) are swung from the position shown in Fig. 11 to that shown in Fig. 13, and thereafter to the raised position shown in Fig. 14, on each revolution of the shaft 24 and consequently on each two beats of the lay.

Each lifter bar 42 is provided with an engaging member 62, pivoted at 63 to the lifter bar and normally held in the withdrawn position indicated in Fig. 11. A latch or control member 64 is provided for each lifter bar, each latch having a stud 65 (Fig. 16) extending through vertical slots 66 in the sides of its lifter bar 42 and having a coil spring 67 mounted thereon. The spring is secured at one end to the lifter bar 42 and at its opposite end to a collar 68 mounted on the stud 65. The spring 67 tends to hold the latch 64 normally in the position shown in Fig. 11.

An indicator or control rod 70 (Fig. 3) is slidably mounted in bearings 71 on the magazine head 30 and is provided with cam portions 72, each one of which is adapted to engage two of the latches 64. The rod 70 is normally held yieldingly in the inoperative position shown in Fig. 3 by a coil spring 74, mounted on a rearward extension thereof. The rod 70 is also bent laterally at its rear end as indicated at 75, said offset end being adapted for engagement with a portion of the weft detector upon indication of weft exhaustion, as will be hereinafter described.

Upon such indication, the control rod 70 is moved forward, causing the cam portion 72 to engage the upper ends of the latches 64 and move them from the position shown in Fig. 11 to that shown in Fig. 12. In this position, the hook-shaped lower end of one of the latches 64 will be engaged by that one of the arms 46 which happens to be aligned therewith by selective movement of the color slide, and that particular latch 64 will be moved downward in the slots 66 in its lifter bar 42.

The engaging member 62 is offset and upturned at its lower end and is provided with a cam surface 77 (Figs. 11 and 16) pressed outward against the stud 65 by a flat spring 78 mounted on the magazine head 30 (Fig. 13) and engaging the member 62 between the sides of the lifter bar 42.

When the latch 64 is moved downward from the position shown in Fig. 12 to that shown in Fig. 13, the stud 65 also moves down along the cam surface 77, permitting the engaging member 62 to be projected outward by its spring 78, as indicated in Fig. 13.

The actuating arm 46 then moves upward, pushing the engaging member 62 yieldingly out of its way during such upward movement, but engaging said member 62 upon its return or downward movement and depressing the bar 42 to the position shown in Fig. 15.

As the bar 42 moves downward, a lug 80 (Fig. 15) on the upper end of the latch 64 engages a pin 81 fixed in the magazine head 30 and is prevented from further downward movement. The bar 42 continues to move downward, however, thus restoring the latch to the position indicated in Fig. 12, in which the latch 64 is raised relative to the bar 42. Such relative upward movement also causes the stud 65 to exert rearward pressure on the cam face 77 and thus withdraw the engaging member 62. Upon its next upward movement the arm 46 engages the projection 45 and restores the lifter bar to raised position. As soon as the latch 64 is released from the pin 81, its spring 67 restores the latch to the position shown in Fig. 11, thus completing the cycle of operations.

Summarizing these operations, it will be seen that the arm 46 is depressed twice to complete the delivery of a weft carrier to an exhausted shuttle. On the first downward movement, the parts are shifted from the position shown in Fig. 11 to that shown in Fig. 13, but without causing downward movement of the selected compartment in the magazine. The shuttle then makes its flight to the opposite side of the loom and if no change in shuttles occurs, the arm 46 will cause the transfer to be completed upon the following pick, when the shuttle returns to the magazine end of the loom. If, however, the boxes change, the parts will remain in the position shown in Fig. 13, preserving the indication until the indicated shuttle eventually returns to the magazine end of the loom, at which time the transfer will be completed.

Transfer mechanism

The transfer mechanism is preferably mounted on the lay 21 and comprises a transferrer 82 (Fig. 7) formed on a slide 83 vertically movable in guideways 84 in a stand 85 bolted to an upward extension of the lay 21. The transferrer 82 is positioned to engage the butt of a bobbin and is provided with an extension having a down-turned end 82ª adapted to engage the tip of a bobbin.

A roll 86 (Fig. 10) is mounted on a stud 86ª secured in the slide 83 and extending through a slot 87 in the stand 84. The roll 86 is positioned for engagement by a transfer lever 88 (Fig. 4) projecting rearwardly from a sleeve or hub 89 mounted on a stud 90 (Fig. 3) fixed in the magazine head 30. A coil spring 91 normally holds the lever 88 in raised position.

An arm 92 (Fig. 2) projects rearwardly from the right hand end of the sleeve or bearing 89 and is provided with a depending hook 93 (Fig. 4) pivoted to said arm 92 at 94. The hook 93 has a flat spring 95 secured to the front face thereof and having its recessed lower end positioned to be engaged by a lug 96 on the side of a lever 97 pivoted at 98 on the magazine stand 35.

The lever 97 is positioned for engagement by any one of the lifter bars 42 which may at any time be depressed, and when thus depressed, the hook 93 is pressed yieldingly rearward to the dotted line position indicated in Fig. 4, in which position it will be engaged by a hook 98 formed at the upper end of an actuating rod 99 (Fig. 1) having a give-way connection with a stud 100 in the lever 58ª pivoted to the loom frame at 59 and having a cam roll at one end to work in cam groove 60ª of cam 61ª.

By these connections, the lever 97 is given a downward movement whenever an indicated shuttle returns to the magazine side of the loom and the corresponding bobbin holder is depressed.

Detecting mechanism

The weft detecting mechanism comprises a casing 102 (Fig. 7) having a hub or bearing portion 103 loosely pivoted on a stud 104 secured in a projection 105 formed on the transferrer stand 85. An arm 105ª is clamped to the outer end of the stud 104 and is provided with an adjusting screw 106 (Fig. 6) which normally engages the front side of the casing 102 and vertically aligns the weft detector with the bobbin in the active shuttle. A coil spring 107 (Fig. 7) is mounted on the stud 104 and engages the casing 102 at one end and the projection 105 at the opposite end, causing the casing 103 to yieldingly engage the rear end of the adjusting screw 106.

A detecting member 110 (Fig. 8) is mounted within the casing 102 and is provided with a depending bearing portion 111 seated in a slide or support 112 mounted within the casing 102 and having an upwardly projecting portion 113. A light spring 114 connects a portion of the detecting member with the inner end of the slide 112. The slide 112 is guided for vertical sliding movement in the casing 102 and is normally maintained in raised position by a spring 115 (Fig. 9), connected at one end to a stud 116 on an upward projection of the casing 102 and at the other end to a stud 117 projecting rearwardly through a slot 118 in the casing 102.

The detecting member 110 has an upwardly projecting portion 120 which normally oscillates forward and rearward with the lay closely adjacent the end of the offset portion 75 of the indicating rod 70 previously described.

The slide or support 112 and the detecting member 110 receive a downward detecting movement on every alternate beat of the lay, such movement being caused by engagement of the portion 113 of the slide 112 by an actuating lever 122 (Fig. 1) pivoted at 123 on the loom frame 20 and connected by a link 124 to a lever 125 mounted on a fixed pivot 126 and having a cam roll 127 engaged by a cam 128 (Fig. 17) on the bottom or cam shaft 24. This shaft rotates once for every two picks of the lay and thus depresses the actuating lever 122 whenever the shuttle is boxed in the magazine end of the lay.

When the slide 112 and detector 110 move downward and the detector engages a well filled weft carrier, the contact end of the detector 110 will be held from movement along the bobbin or weft carrier, and the upward projection 120 will maintain its vertical position, clearing the offset end 75 of the indicator rod 70.

If, however, the weft is substantially exhausted, the detector 110 will slide along the weft carrier, swinging the upward projection 120 to the position indicated in dotted lines in Fig. 7, in which position it will engage the end 75 of the indicating rod 70 as the lay swings forward, thus indicating weft exhaustion to the magazine and initiating replenishment of the exhausted shuttle.

The detecting member 110 is preferably provided with a lug or projection 130 (Fig. 8) which engages the inner face of the side wall 131 of the casing 102 when the detector is in raised position and remains in such engagement so long as extreme downward movement of the detector is prevented by engagement thereof with a well filled bobbin. The detector is thus held from any longitudinal or slipping movement whatever until it engages a bobbin which is somewhat reduced in size, after which time the projection 130 will move below the casing 102 and the detector 110 will be free to swing longitudinally of the weft carrier.

Upward movement of the transferrer slide 83 is caused by a spring 133 (Fig. 5) connected at its upper end to the stand 84 and at its lower end to a projection on the slide 83. The upward limit of travel is determined by an adjusting screw 134 threaded in an upward extension 135 of the stand 84.

*Carrier mechanism*

I have provided special mechanism for positively removing the lowermost weft carrier from a depressed compartment 38 to the transferrer 82. For this purpose a supporting rod 140 (Fig. 1) is pivoted to swing about the axis of the rock shaft 23 which supports the lay, and is provided at its upper end with a head 141 having a rearward projection 142 having portions 143 and 144 (Fig. 5) adapted to engage the butt and tip of a weft carrier in a depressed bobbin holder or compartment 38.

A fixed guide plate 145 (Fig. 1) supports the weft carrier in its rearward movement, until it engages an arc-shaped lower portion 146 (Fig. 6) of an arm 147, pivoted at 148 on the frame of the magazine M. The portion 146 of the arm 147 has a lug or projection 149 adapted to engage the weft detecting member 110 whenever said member 146 is moved rearward and by such engagement the detecting mechanism is swung about its supporting stud 104 to the position shown in Fig. 6 whenever transfer is about to take place.

The carrier arm 140 (Fig. 1) is connected by a link 150 to a bell crank 151 pivoted at 152 and having a cam roll 153 (Fig. 17) positioned in the cam groove 154 of a switch cam 155 mounted on the cam shaft 24. The cam groove 154 of the cam 155 is concentric with the shaft 24, and so long as the roll 153 travels in the groove 154 no movement of the bell crank 151 occurs.

The cam is provided, however, with an outer track 156, entrance to which is controlled by a switch 157 and exit therefrom by a switch 158. The switches 157 and 158 are normally held in the position shown in Fig. 17 by a flat spring 159 engaging studs on the switches 157 and 158 near the end portions of the spring and engaging a stud 160 fixed in the cam 155 near the center of the spring.

The switch 157 has a stud 161 engaged by the cam face 162 of a control lever 163 mounted on a fixed pivot 164. When the lever 163 is in the position shown in Fig. 17, the cam face 162 is concentric with the shaft and the switch 157 is permitted to be moved to its outer or closed position by the spring 159 as it approaches the roll 153.

If the lever 163 is moved to the position shown in Fig. 18, the switch 157 is forced inwardly, causing the roll 153 to traverse the outer track 156 and to return to the track 155 by yielding movement of the switch 158.

The lever 163 is connected by a link 170 (Fig. 1) to a bell crank 171, which in turn is connected by a link 172 (Fig. 4) to the lever 97 which positions the hook 93 and thus renders the transfer mechanism operative. A spring 173 holds the lever 151 normally rearward and the lever 97 normally raised.

The parts are so timed that the carrier member 142 will first engage a bobbin W in the depressed bobbin holder, as indicated in Fig. 5, moving the bobbin rearward along the guide plate 145 until it engages the portion 146 of the arm 147, and thereafter continuing the rearward movement to the position indicated in Fig. 6, whereupon the transferrer 82 will promptly descend to transfer the fresh weft carrier or bobbin to the substantially exhausted shuttle.

*General operation*

Having described the details of construction of my invention and the operation of the several parts thereof, the general operation of the invention will be readily apparent. The different kinds of weft carriers or bobbins W are stored in the magazine compartments 38, with the weft ends E extending out through slots 31ª (Fig. 3) in the end of the magazine to a fixed end holder (not shown). The detector 110 is forced downward against the weft in the active shuttle at every alternate beat of the lay and upon engagement with a substantially exhausted weft carrier the detector slips along the barrel of the weft carrier, causing the upper end of the detector to engage the indicating rod 70 and initiate downward movement of the corresponding compartment 38. This downward movement actually takes place upon the return of the indicated shuttle to the magazine side of the loom, the selected compartment assuming the position indicated at the left in Fig. 5, with its lowermost bobbin W positioned for engagement by the carrier member 142, which thereupon moves rearward, thus moving the bobbin or weft carrier W to the position indicated in Fig. 6, from which it is transferred downward by the transferrer 82. The parts are then restored to normal position and the operation of the loom continues until exhaustion of another weft carrier is indicated.

It should be particularly noted that the fresh weft carrier is under positive control during its entire movement and that it has no free falling movement during which it may become displaced and prevent satisfactory transfer.

Having thus described my invention and the advantages thereof, I do not wish to be limited to the details herein shown and described, otherwise than as set forth in the claims, but what I claim is:—

1. In a weft replenishing loom, a magazine having a stationary frame and comprising a plurality of separately movable compartments each having capacity for a plurality of bobbins of a selected kind or color, means to depress a selected compartment, a carrier effective to positively move the lowermost bobbin in said depressed compartment rearward, fixed means to support said bobbin against downward movement during the first part of its rearward movement, and additional and separate means to similarly support said bobbin during the latter part of its rearward movement, and a transferrer effective to insert said bobbin in the running shuttle.

2. In a loom, a lay, a magazine having a plurality of vertically movable compartments, means to depress a selected compartment, positively acting means effective to move a selected bobbin rearwardly from said compartment to a position above the lay, a yielding device effective to hold said bobbin against the rearward face of said positive means during the latter part of said rearward movement and a transferrer mounted on the lay and effective to transfer said bobbin downwardly to the running shuttle.

3. In a weft replenishing loom, a lay, a transferrer mounted for vertical transferring movement thereon, a side-slip weft detector mounted on said lay, and means to depress said detector on every alternate beat of the lay and to hold said detector in raised inoperative position on the intervening beats of the lay.

4. In a weft replenishing loom, a lay, a transferrer, a weft detector mounted on said lay, and means to depress said detector on every alternate beat of the lay, said detector being mounted for rearward movement relative to said lay by presentation of a weft carrier beneath said transferrer.

5. In a loom, a vertically movable transferrer, means actuating said transferrer, a positively acting swing arm operative to present a selected weft carrier in the path of said transferrer upon indication of weft exhaustion in the active shuttle, and a normally operative weft detector removable from operative position by such rearward movement of said weft carrier.

6. In a loom, a lay, a weft detecting member, a support for said member pivoted on said lay and yielding means to hold said support normally in operative position on said lay, said supporting and detecting member being pushed rearward out of operative position by presentation of a weft carrier in position for transfer to the running shuttle.

7. In a loom, a lay, a side slip feeler member, a support in which said member is movable longitudinally of the lay to indicate weft exhaustion, said support being mounted on said lay and said support and member being movable forward and rearward therewith, and an indicating device engaged by said member during such forward movement after said member has been moved sideways by engagement with a substantially exhausted weft carrier.

8. In a loom, a lay, a magazine having a stationary frame, an indicating device thereon, a weft detecting member mounted on said lay and movable forward and rearward therewith, said member being normally out of alignment with said indicating device but being moved into position to engage said device upon substantial exhaustion of weft in the running shuttle.

9. In a loom, a lay, a magazine having a stationary frame, an indicating device thereon, a side slip weft detecting member mounted on said lay and movable forward and rearward therewith, said member being normally out of alignment with said indicating device but being moved into position to engage said indicating device upon substantial exhaustion of weft in the running shuttle.

10. In a weft replenishing loom, a lay, a transferrer mounted thereon, a weft detector mounted on said lay, means to give said detector a detecting downward movement on each alternate movement of the lay, means to give said transferrer a transferring downward movement upon presentation of a weft carrier thereto, and means to remove said detecting member rearward from operative position upon downward movement of said transferrer.

11. In a loom, a magazine having a stationary frame with vertical guideways in said frame, bobbin holding compartments slidable in said guideways, and means to depress a selected compartment corresponding to the weft in the active shuttle upon indication of weft exhaustion, said depressing means including a device effective to hold a transfer indication until return of the indicated shuttle to the magazine side of the loom.

12. In a weft replenishing loom having shifting shuttle boxes, a plurality of vertically moving stacks of bobbins, one stack for each shuttle box, a normally retracted latch for each stack, a weft detector, means operative by the weft detector on an indicating detecting beat of the loom to move the latch corresponding to the shuttle box in active position to operative position while the stacks of bobbins are at rest, and means effective on a subsequent pick of the loom to engage the latch to lower the corresponding stack of bobbins.

13. In a weft replenishing loom having a plurality of shifting shuttle boxes, a plurality of vertically movable bobbin carrying elements, each corresponding to one of the shuttle boxes, a bobbin moving member movable under the elements and adapted to engage the lowermost bobbin of any element which may be in lowered position, a lever controlling said bobbin moving member, said lever being positioned to be engaged by each element, and means to move downwardly the element corresponding to the shuttle box in active position, downward movement of any element moving the lever into controlling position for the bobbin moving member, whereby any element may act on the lever to initiate bobbin engaging movement on the part of the bobbin engaging member.

14. In a weft replenishing loom having shifting shuttle boxes, a plurality of vertically movable stacks of bobbins, each stack having a distinctive type of bobbin, an upright sliding member for each stack, an actuator for the members movable in timed relation with the shuttle boxes and operatively related to but one of the sliding members at a time, means to initiate replenishment on a detecting beat of the loom, means to operate said actuator to give the stack of bobbins corresponding to the indicating shuttle a vertical reciprocation from normal to low position and back again to normal position on the same beat of the loom, and a bobbin moving element moving under all of the stacks to disengage the lowermost bobbin of the lowered stack.

15. In a weft replenishing loom having shifting shuttle boxes, a plurality of vertically sliding stacks of bobbins, a member for each stack having vertical sliding movement, a latch for each member normally in retracted position, a weft detector, means operative by the detector to move the latches from retracted to operative position on an indicating beat of the loom, an actuator movable in timed relation with the shuttle boxes and operatively related to but one latch at a time, to set the latch corresponding to the shuttle box in active position, said actuator on a subsequent pick of the loom engaging said latch which was previously set to depress the member and stack of bobbins corresponding thereto and to return said stack and member to normal position on the same pick of the loom.

In testimony whereof I have hereunto affixed my signature.

ALBERT A. GORDON.